United States Patent [19]

Ratliffe

[11] 4,305,219
[45] Dec. 15, 1981

[54] CRAB-CATCHING DEVICE

[76] Inventor: Hallie C. Ratliffe, 4000 Sheringham Rd., Richmond, Va. 23235

[21] Appl. No.: 110,875

[22] Filed: Jan. 10, 1980

[51] Int. Cl.³ ............... A01K 74/00; A01K 69/10
[52] U.S. Cl. .................................. 43/7; 43/105; 150/49
[58] Field of Search ........... 43/7, 12, 42.7, 100, 43/105; 150/49; 224/45 C, 45 W

[56] References Cited

U.S. PATENT DOCUMENTS

| | | | |
|---|---|---|---|
| 248,783 | 10/1881 | Oblinger | 150/49 |
| 551,468 | 12/1895 | Hibbert | 43/7 |
| 563,486 | 7/1896 | Nibbert | 43/7 |
| 1,032,100 | 7/1912 | Zeuely | 43/105 |
| 1,193,816 | 8/1916 | Ottmann | 43/105 |
| 1,339,275 | 5/1920 | Mueller | 43/105 |
| 1,984,239 | 12/1934 | Starks | 43/7 |
| 2,252,949 | 8/1941 | Schell | 43/7 |
| 3,314,187 | 4/1967 | Marcinkowski | 43/105 |
| 4,092,797 | 6/1978 | Azurin | 43/105 |

Primary Examiner—Stephen G. Kunin
Assistant Examiner—K. Bradford Adolphson
Attorney, Agent, or Firm—Norman B. Rainer

[57] ABSTRACT

A device for catching crabs is described comprised of a frame portion and attached net structure. The frame portion, comprised of three U-shaped members, can be deployed to a functional state having a perimeter from which said net structure is suspended, and a handle adapted to receive a tether line used to lift the device vertically from a body of water. When placed in a collapsed state for storage, the three frame members lie closely adjacent each other, thereby occupying considerably less space than the device in its deployed state.

6 Claims, 4 Drawing Figures

CRAB-CATCHING DEVICE

BACKGROUND OF THE INVENTION

This invention relates to a crab-catching device, and more particularly to a crab-catching device collapsible to small size for convenient storage.

Several general types of crab-catching devices involving various designs and principles of operation are disclosed in the prior art. The style of crab-catching device which the present invention relates to consists essentially of a flexible net portion and a frame portion, the device being adapted to be used in a manner whereby it is baited and allowed to rest on the bottom of the body of water from which the crabs are to be removed. A tether means such as a line or cable is attached to the device at a handle associated with said frame. At an appropriate instant, when the operator of the device has reason to believe that a crab may be in the net, the device is suddenly lifted vertically out of the water. The frame structure must possess adequate strength to survive the high force suddenly applied at the instant of lifting.

An exemplary crab-catching device of the aforementioned general type is disclosed in U.S. Pat. No. 551,468 to Hibbert. The device of said patent has a frame comprised of three semicircular members of band-like configuration adjustably interconnected by threaded fasteners at two opposed sites in a manner whereby two of said members may be deployed in coacting relationships to form a circular rim which supports a net, and the third frame member serves as a handle disposed in a plane vertical to said circular rim. When not in use, the device can be collapsed to a smaller size wherein the three semicircular members are made to lie closely adjacent each other.

Although the Hibbert device is functionally effective, it requires the use of band-like members capable of abutment to secure structural integrity, and threaded fasteners which are subject to corrosive malfunction by the effects of salt water. If the frame of the Hibbert device were to be fabricated of corrosion-resistant materials of suitable dimensions to provide adequate strength and functionalty, the cost of the device would be prohibitively high.

It is accordingly an object of the present invention to provide an adjustable crab-catching device of economical construction capable of existing in a functional state and a storage state occupying less space than said functional state.

It is a further object to provide a device of the aforementioned nature, the design of which minimizes malfunction due to the corrosive influence of salt water.

It is a still further object of the present invention to provide a device of the aforementioned nature wherein the device, in its functional state, is intended to be rapidly lifted from submersion in a body of water.

These objects and other objects and advantages of the invention will be apparent from the following description.

SUMMARY OF THE INVENTION

The above and other beneficial objects and advantages are accomplished in accordance with the present invention by the provision of an improved crab-catching device comprising a frame portion and attached net structure. Said frame portion is comprised of three members of generally U-shaped configuration.

The extreme terminal ends of a first member of said frame portion are formed into hook-like appendages which rise out of the plane of the U-shaped member and project essentially perpendicularly transverse to the immediately preceding section of said member. A pair of retaining loops is provided in said first member, said loops projecting upwardly from the plane of said member and being located closely adjacent said hook-like appendages. The extreme terminal ends of the second and third members of said frame portion are formed into closed loops which lie substantially within the planes of said members and which engage said retaining loops of said first frame member to permit said second and third members to have at least 180 degrees of pivotal movement about said retaining loop.

The second frame member is further disposed in engagement with said retaining loops in a manner whereby, when said first member is positioned with said retaining loops directed upward, said second member is capable of being rotated into the plane of said first member in opposed relationship thereto, forming a closed perimeter and permitting engagement by the terminal hooks of said first member. In order to achieve engagement of said second member by the hooks of said first member, at least one of said first and second members must possess some flexibility.

The third frame member is disposed between said first and second members, and functions as a handle, to which is attached a tether line and optionally, bait holding means.

Said first and second frame members are further distinguished from said third frame member insofar as said net is attached to said first and second members in a manner such that, when said first and second members are united by said hook means to form a closed perimeter, said net will hang pendantly therefrom as a loose punch-like structure.

BRIEF DESCRIPTION OF THE DRAWINGS

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
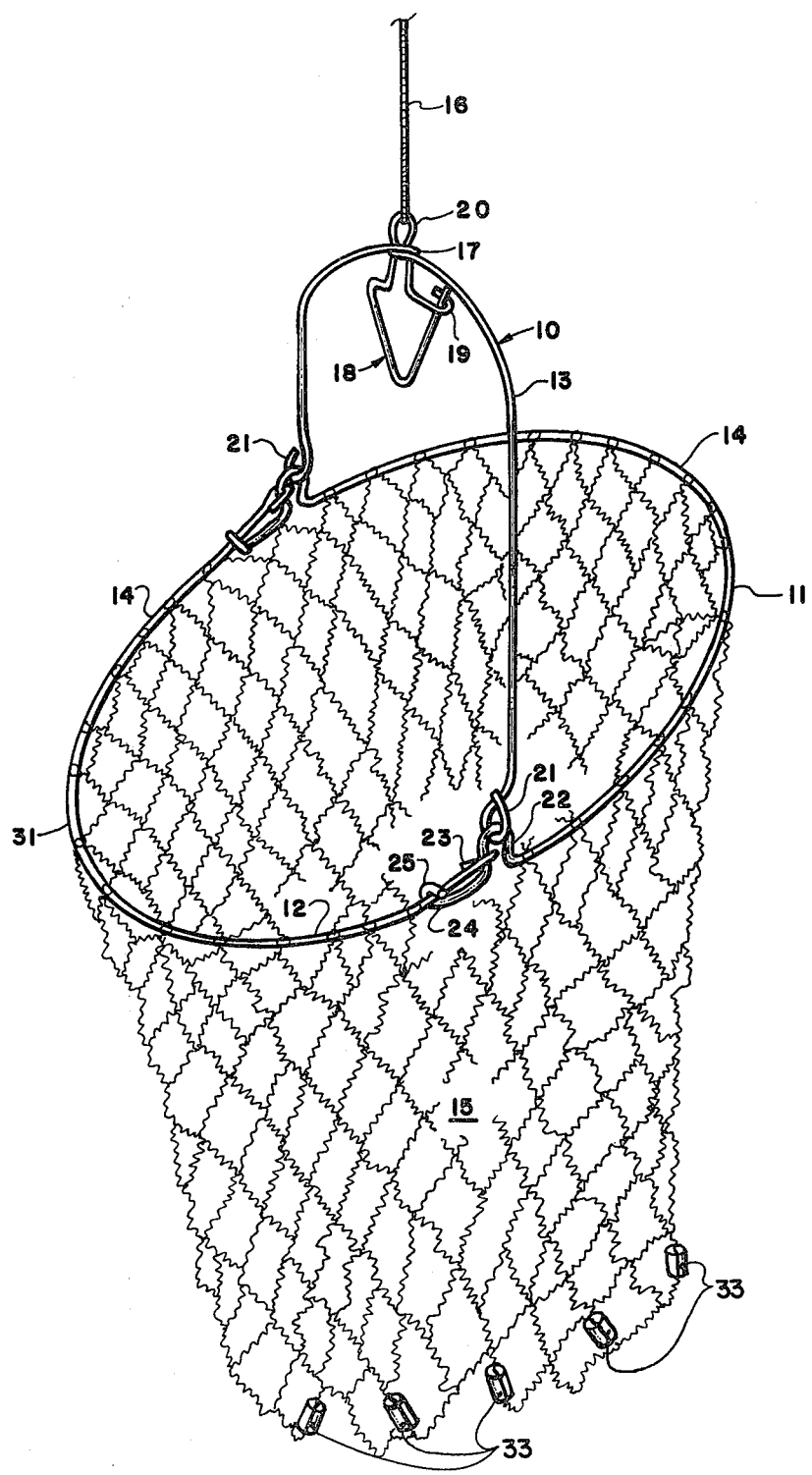
FIG. 1 is a perspective view of the crab-catching device of this invention in its deployed, functional state, shown suspended from a tether line.

Referring to FIG. 1, which illustrates an embodiment of the crab-catching device of this invention in its deployed, functional state, frame portion 10 is shown to be comprised of first member 11, second member 12, and third member 13. Said first and second members, in their interengaged, coplanar configuration define a closed perimeter 14, from which net structure 15 is suspended.

Said third member 13, shown in upright position, serves as the handle for the device. A tether line 16, attached to the upper center of said handle enables the device to be vertically lifted from a position of repose as the bottom of the body of water from which crabs are to be taken. To facilitate centered attachment of line 16, handle 13 may be provided with a loop 17 at the upper center thereof. Bait-holding means 18 having a safety pin-type locking feature 19 may optionally be retained in place by loop 17 in handle 13. In such event, tether line 16 may be fastened to a vertically disposed loop 20 in bait-holding means 18 extending above loop 17 of handle 13.

Figure 2:
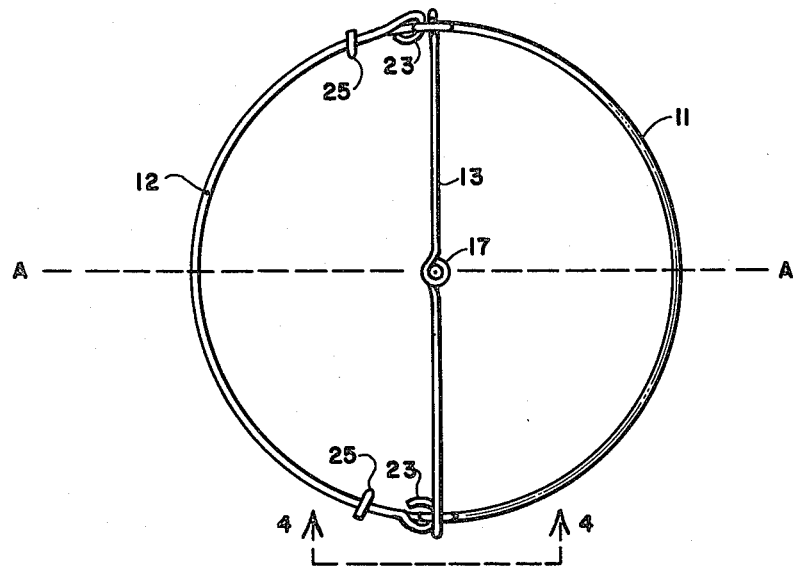
FIG. 2 is a top view of the device of FIG. 1 with the net structure removed for clarity of illustration.

Each of the two extremities of handle 13 is provided with a closed loop 21 which lies in the plane of handle 13 and engages corresponding loops 22 of first member 11. Each of the two extremities of second member 12 is provided with a closed loop 23 which lies in the plane of said second member and engages corresponding loops 22 of first member 11. It is to be noted that loops 23 of said second member engage loop 22 of said first member at a position closer to the extremity 24 of said first member than loops 21 of said handle member 13. In the deployed configuration illustrated in FIGS. 1 and 2, and in the collapsed state shown in FIG. 3, the device has a plane of symmetry A—A relative to all components except optional bait-holding means 18.

Figure 4:
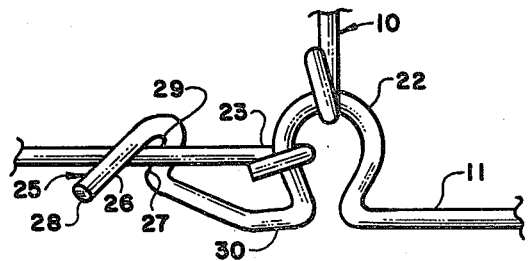
FIG. 4 is an enlarged fragmentary side view of a terminal portion of the first frame member of FIG. 1.

Hook means 25, as shown more clearly in FIG. 4, is an integral continuous extension of first frame member 11, and is configured in a manner so as to have upper restraining surface 26 and lower restraining surface 27 spaced apart one above the other in substantially parallel juxtaposition. The function of the two restraining surfaces of hook means 25 is to engage with second frame member 12 in a manner to restrict both upward and downward movement thereof. Engagement of hook means 25 with said second frame member is achieved by causing hook means 25 to be displaced horizontally until the end 28 of said hook means passes beyond said second frame member and is then allowed to snap thereupon. With sufficient resiliency within said first and second frame members, hook means 25 will maintain second frame member 12 in the bight 29 separating retaining surfaces 26 and 27.

Figure 3:
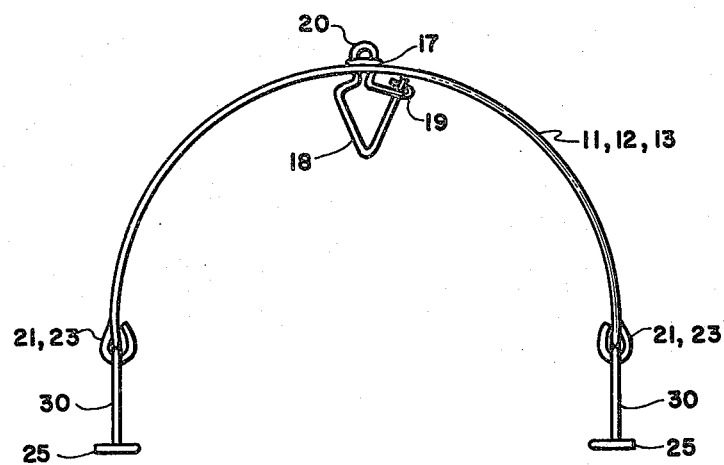
FIG. 3 shows the device of FIG. 1 in its storage state with the net structure removed for clarity of illustration.

The position of hook means 25 relative to loop 22 of said first frame member is determined by the length of extension arm 30. It is preferable that hook means 25 extend between 20% and 50% toward the outer extremity 31 of said second frame member. Extensions less than 20% provide less than adequate support for said second frame member, and extension greater than about 50% cause the device to occupy considerably more space in the folded or storage state, as shown in FIG. 3.

The frame members of the device of this invention may be fabricated of iron wires having thicknesses comparable to those generally employed as clothes hangers. The wire can be bent to appropriate form by known methods. A paint or other protective coating may be applied to the frame portion prior to attachment of the net structure. The U-shaped frame members may have the configuration of half circles, half rectangles or other comparable coplanar structures which may be characterized in having a line of symmetry, and a continuous structure terminating in two ends.

The net may be attached by sewing, glueing, stapling or other known methods to the first and second frame members, weight means 33 may be associated with said net to preserve its pouch-like configuration.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A crab-catching device collapsible to small size for convenient storage comprising a frame portion and attached net structure, said frame portion being comprised of first, second and third U-shaped members, each possessing a plane of symmetry and two opposed ends equally spaced from said plane of symmetry, said second and third members having at their ends closed loops in substantially coplanar disposition with respect to said members, said first member having adjacent each end hook means and a loop further removed from said end than said hook means and disposed normally with respect to the plane of the U-shape of said first member, each of said hook means are integral continuous extensions of said first frame member and are configured in a manner so as to have upper and lower restraining surfaces spaced apart one above the other in substantially parallel juxtaposition, whereby said hook means cooperate to restrict both upward and downward movement of said second frame member, the loops of said second and third members engaging the loops of said first member in a manner such that said second member can be pivotably moved about the interengaged loops to a position opposed to and substantially coplanar with said first member to form therewith a closed perimeter and engage said hook means by resilient deformation, and said third member can pivotably move about said interengaged loops to a position perpendicular to said perimeter and thereby function as a handle to which a tether may be attached, said net structure being attached to said first and second members and descending from said perimeter in a pouch-like configuration.

2. The crab-catching device of claim 1 wherein said U-shaped members have a semi-circular configuration.

3. The crab-catching device of claim 1 wherein the closed loops of said second and third U-shaped members are integral extensions of said members.

4. The crab-catching device of claim 1 wherein at least one of said first and second U-shaped members possesses resilient characteristics.

5. The crab-catching device of claim 1 wherein said U-shaped members are comprised of appropriately bent portions of cylindrical metal rod stock.

6. The crab-catching device of claim 1 wherein said hook means extends between 20% and 50% toward the site where said second frame member is intersected by the plane of symmetry of said second frame member, said site being the bottom of the U-shaped configuration most distant from its ends.

* * * * *